Patented Dec. 12, 1944

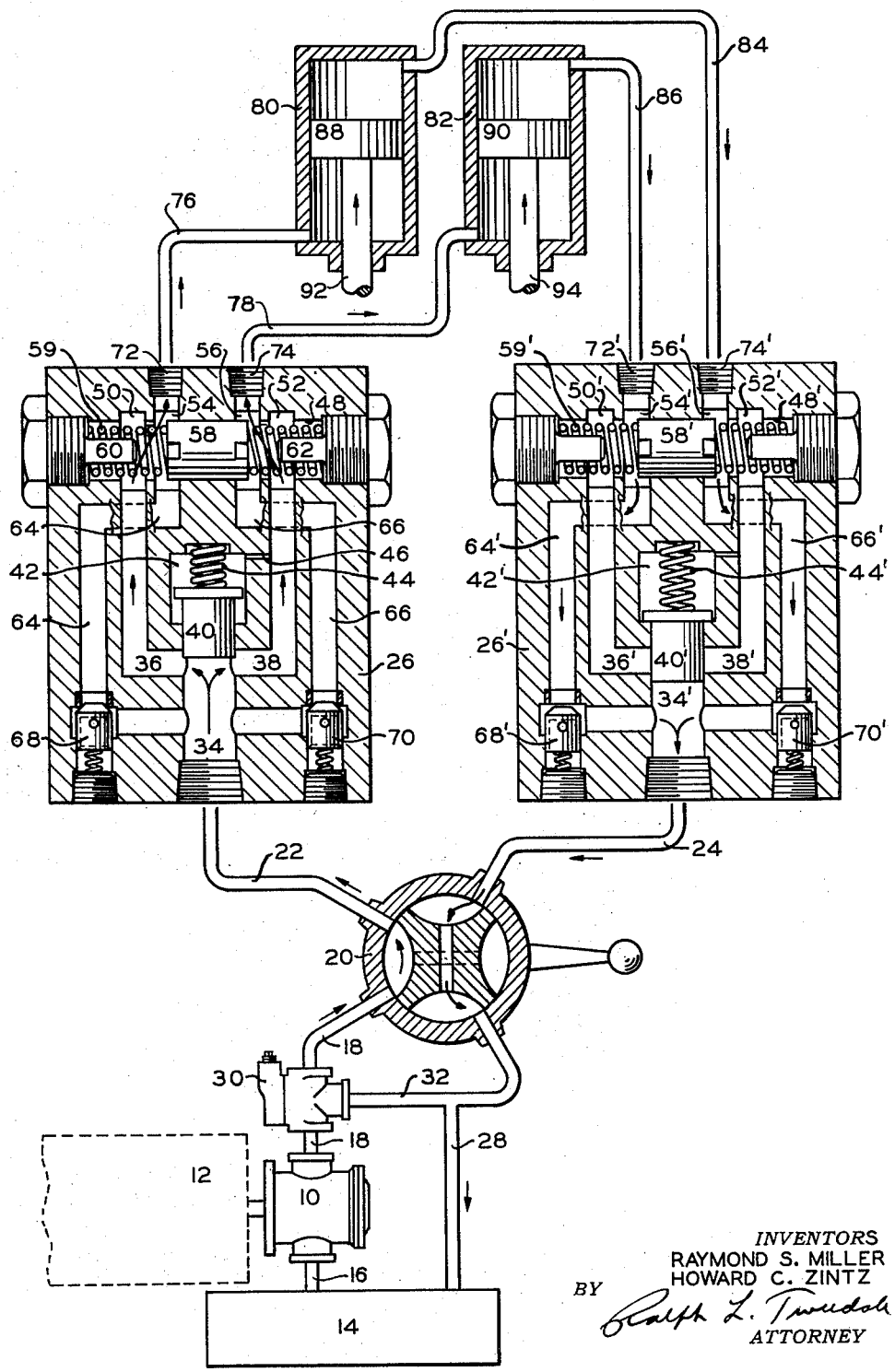

2,365,095

UNITED STATES PATENT OFFICE 2,365,095

POWER TRANSMISSION

Raymond S. Miller and Howard C. Zintz, Detroit, Mich., assignors to Vickers Incorporated, Detroit, Mich., a corporation of Michigan Application August 19, 1941, Serial No. 407,442

2 Claims. (Cl. 137—166)

This invention relates to power transmissions, particularly to those of the type comprising two or more fluid pressure energy translating devices, one of which may function as a pump and another as a fluid motor.

It is well known that, where two or more fluid motors are connected in parallel to a common source of pressure fluid, the fluid seeks the path of least resistance, and, accordingly, the motor having the lightest load receives all of the fluid supply. Accordingly, where two or more motors are used to operate independently variable loads, the parallel connection has heretofore been impractical.

It is an object of the present invention to provide an improved valve and circuit whereby fluid motors may be operated successfully in parallel with a common pressure supply.

A further object is to provide a valve and circuit of this character wherein two motors will be operated at substantially equal rates of speed independently of the relative load resistance of one motor as compared to another.

Further objects and advantages of the present invention will be apparent from the following description, reference being had to the accompanying drawing wherein a preferred form of the present invention is clearly shown.

In the drawing:

The single figure is a diagrammatic view of a power transmission system incorporating a preferred form of the present invention.

There is indicated at 10 a pump which may be driven by an aircraft engine or any suitable prime mover indicated diagrammatically at 12. The pump 10 is adapted to withdraw fluid from a tank 14 through a suction conduit 16 and deliver the same by a conduit 18 to the pressure port of an open-center, rotary, four-way valve 20. The two cylinder ports of valve 20 are connected by conduits 22 and 24 to flow-dividing valves 26 and 26', of identical construction, while the tank port is connected by a conduit 28 to tank 14. Conduit 18 is provided with a relief valve 30 of conventional construction which is adapted to pass the pump delivery to tank through a conduit 32 and the conduit 28 whenever a predetermined pressure is exceeded in conduit 18.

As the two flow-dividing valves are the same, one will be described in detail with the corresponding parts of the other designated with the same numbers primed.

Conduit 22 connects into a passage bore 34, in valve 26, from which two branch passages 36 and 38 extend. The upper end of bore 34 has a spring-loaded valve 40 slidably mounted therein which, when in its lower position, blocks passages 36 and 38 from bore 34. The upper end of valve 40 projects into a chamber 42 which houses a spring 44 normally urging valve 40 to its lower closed position. Chamber 42 is in communication with passage 38 through a passage 46. Passages 36 and 38 open into opposite ends of a valve bore 48 through ports 50 and 52, respectively. In between ports 50 and 52 and respectively adjacent thereto are two annular cylinder ports 54 and 56. A double throttle valve spool 58 is freely slidable in bore 48 between two limit stops 60 and 62 at the left and right ends of bore 48. Valve 58, when in its center position, as shown in the drawing, opens ports 50 and 52 to ports 54 and 56, respectively, permitting unrestricted flow therethrough. When valve 58 moves to one side or the other, it gradually restricts either port 54 or 56 and increasingly opens the other without substantial change in resistance therethrough. Light springs 59 may be provided for restoring valve 58 to center position when pressures on both ends thereof are equal. Ports 54 and 56 are connected back to bore 34 by internal passages 64 and 66, containing check valves 68 and 70, respectively. Ports 54 and 56 also have external connections 72 and 74 which are connected by conduits 76 and 78 to the rod ends of two cylinders 80 and 82, respectively. The head ends of cylinders 80 and 82 are connected by conduits 84 and 86 to the external connections 72' and 74' of valve 26'.

Cylinders 80 and 82 have slidably mounted therein pistons 88 and 90 carrying rods 92 and 94, respectively. Rods 92 and 94 may be operatively connected, for example, to the air brake, wing flaps or to each wheel of a retractable landing gear of an airplane.

In operation, with the parts in the position shown in the drawing and the pump 10 operating, fluid is drawn from tank 14 through conduit 16 and delivered by conduit 18, valve 20 and conduit 22 to the bore 34 in valve 26.

Valve 40 has been lifted against its spring by pressure fluid in bore 34 and passes fluid therefrom to passages 36 and 38 at a constant pressure drop regardless of the rate of flow therethrough. Fluid in passage 36 is directed to the rod end of cylinder 80 through ports 50 and 54 of valve bore 48 and conduit 76 while the rod end of cylinder 82 receives fluid from passage 38 through ports 52 and 56 and conduit 78. Check valves 68 and 70 prevent flow from bore 34 through passages 64 and 66. The throttle valve 58 is midway between its limit stops 60 and 62, thereby equally dividing the flow from pump 10 to the cylinders 80 and 82.

Pistons 88 and 90 are moving up with fluid from the head ends exhausting through conduits 84 and 86 to connections 74' and 72' of valve 26', respectively. Valve 40' is held closed by its spring 44' so fluid at connections 72' and 74' passes to ports 54' and 56' and through passages 64' and 66' and check valves 68' and 70', respectively, to bore 34' which is connected to tank 14 by conduit 24, valve 20 and conduit 28.

It will be seen that the two cylinders 80 and 82 are connected in parallel with valve 26 dividing the pump delivery between them. As long as pistons 88 and 90 meet equal resistance, as offered by the work, they will move together at the same speed. While this condition prevails, pressure in the rod ends of both cylinders and in valve bore 48 on both sides of valve 58 will be equal, thereby holding valve 58 in its center position to equally divide the pump delivery to both cylinders. However, if piston 88, for example, should meet greater resistance than piston 90, pressure in the rod end of cylinder 80 will rise above that in cylinder 82. This pressure differential will also exist between the two ends of valve bore 48.

Accordingly, with the pressure in the left end of bore 48 higher than that in the right end, valve 58 will move to the right to restrict the flow from port 52 to port 56. Valve 58 will continue to move until the back pressure built up in the right end of bore 48, due to the restricting of port 56, equals the pressure in the left end of bore 48 due to the increased load on piston 88. When this point is reached valve 58 will stop as both ends are subjected to the same pressure. It will be noted that the degree of restriction of ports 54 and 56 is inversely proportional to the resistance offered by pistons 88 and 90. Accordingly, throttle valve 58, in its new position, permits free flow at high pressure through port 54 to cylinder 80 and restricted flow at reduced pressure through port 56 to cylinder 82. This restriction at the right end of valve 58 may be considered as an additional or artificial load imposed on the right-hand circuit to bring its total load up to the load on the lefthand circuit. It has been mentioned that valve 58 comes to a stable position in which the pressure in passage 38 is substantially equal to the pressure in passage 36. Accordingly, there will be substantially equal pressure drops between passage 34 and the respective passages 36 and 38. Since valve 40 at any degree of opening creates equally sized orifices leading to these respective passages, the flow rates through such orifices must also be equal. Since the exact quantity of liquid entering passage 36 or 38 must also leave the valve through pipe 76 or 78, respectively, it follows that the two pistons move up at the same speed.

If the loads on pistons 88 and 90 should again become equal, valve 58 will move back to its center position as shown. This could occur by a decrease in the load on piston 88 or an increase on piston 90. In the former, pressure in the rod end of cylinder 80 and the left end of bore 48 would drop permitting the higher pressure in the right end of bore 48 to move valve 58 to center while, in the latter case, pressure in the rod end of cylinder 82 and the right end of bore 48 would rise over that in the left end of bore 48 to shift valve 58 to center position.

Any variation in the load between pistons 88 and 90 will be reflected to the throttle valve 58 to equalize the flow to cylinders 80 and 82.

The pistons 88 and 90 may be moved downwardly by rotating four-way valve 20 counter-clockwise to place the delivery conduit 18 in communication with conduit 24 and tank conduit 28 with conduit 22. Operation is the same as described as when pistons 88 and 90 were moving up except that fluid is delivered to the head ends of cylinders 80 and 82 through conduit 24, valve 26' and conduits 84 and 86, while exhaust fluid from the rod ends passes through conduits 76 and 78, valve 26, conduit 22, valve 20 and conduit 28 to tank. Throttle valve 58' controls flow to cylinders 80 and 82 on a down stroke in the same manner as valve 58 does on an up stroke.

To place the machine at rest, valve 20 is rotated clockwise until conduit 18 is in communication with conduit 28. This passes the pump delivery to tank at substantially zero pressure and blocks conduit 22 and the rod ends of cylinders 80 and 82.

While the form of embodiment of the invention as herein disclosed constitutes a preferred form, it is to be understood that other forms might be adopted, all coming within the scope of the claims which follow.

What is claimed is as follows:

1. A flow-dividing valve for proportioning the flow rate between a pair of conduits connecting two variable load motors in a parallel circuit with a source of pressure fluid, said valve comprising a common inlet connection having a single spring-loaded resistance valve therein provided with a pair of concurrently controlled outlet orifices, branch conduits extending from the resistance valve, and a pressure equalizing valve controlling the flow through said branch conduits and responsive to a rise in pressure in either conduit for increasingly restricting the other branch conduit and vice versa to maintain equal pressures in said branches.

2. A flow-dividing valve for equalizing the flow rate between a pair of conduits connecting two variable load motors in a parallel circuit with a source of pressure fluid, said valve comprising a common inlet connection and a pair of branch outlet connections, a pressure responsive dividing valve responsive to a difference in pressure between said branch conduits for restricting the branch having the lower pressure, and means for maintaining between said inlet and a point in each branch conduit ahead of said dividing valve variable orifices which are always equal to each other in size and means subjecting said orifices to constant drops in fluid pressure.

RAYMOND S. MILLER.
HOWARD C. ZINTZ.